UNITED STATES PATENT OFFICE.

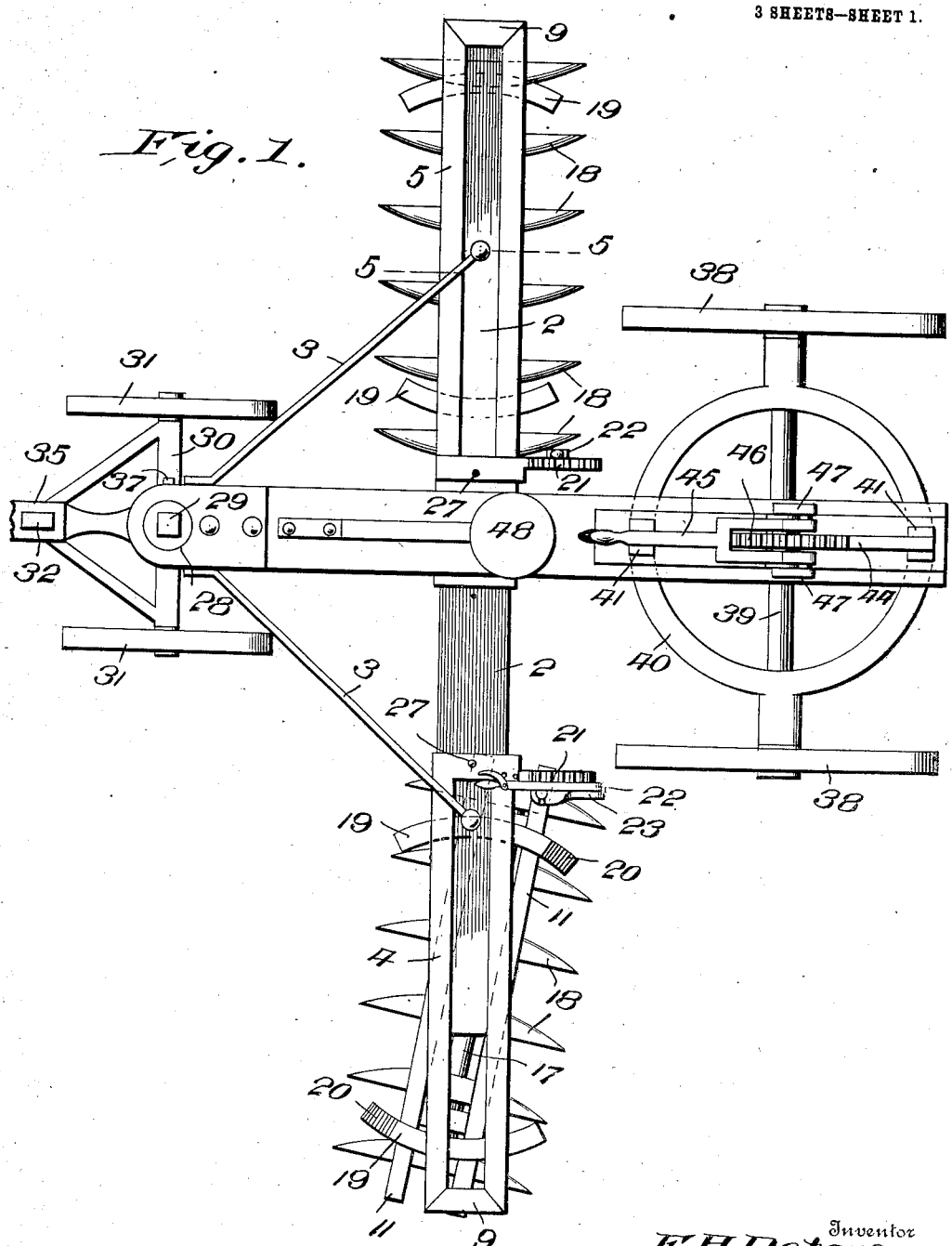

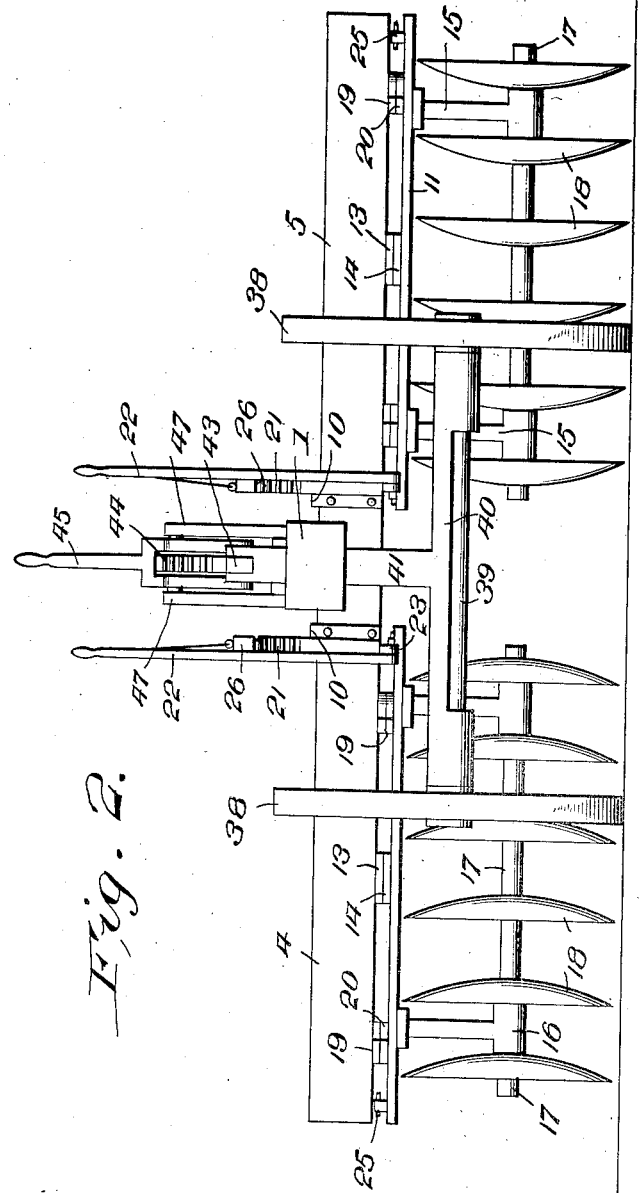

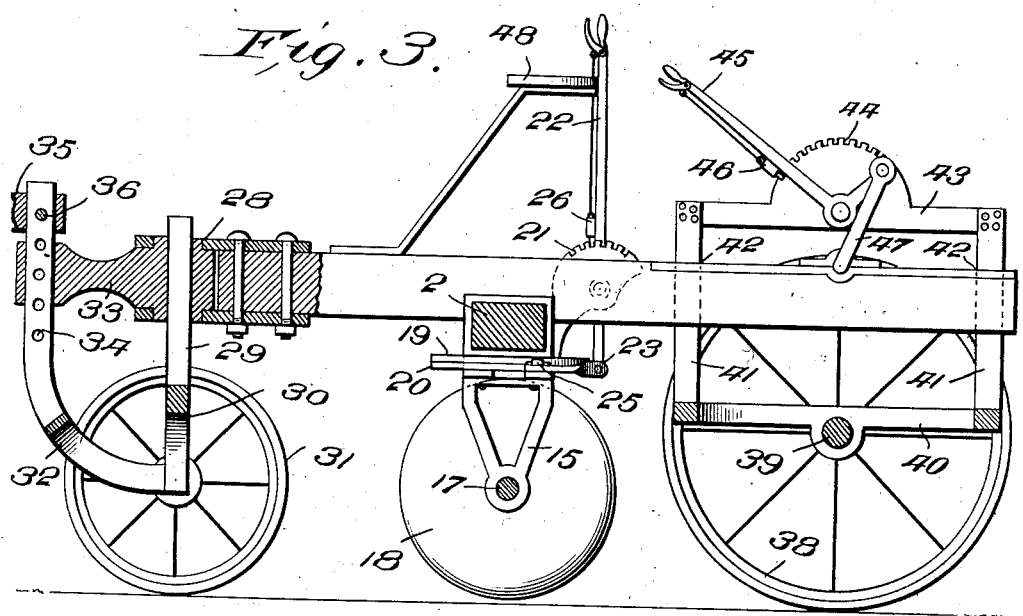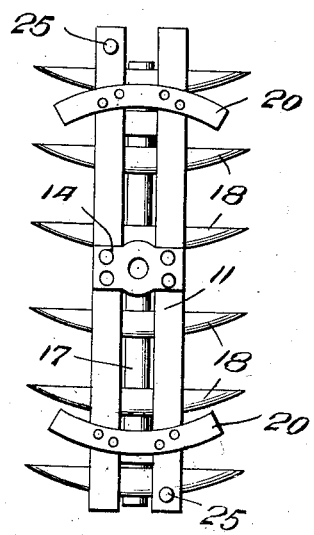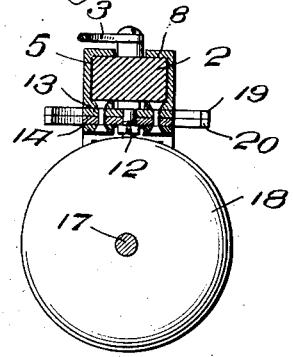

EUGENE H. PETERS, OF BENTON HARBOR, MICHIGAN.

HARROW.

No. 839,887.      Specification of Letters Patent.      Patented Jan. 1, 1907.

Application filed May 29, 1906. Serial No. 319,374.

*To all whom it may concern:*

Be it known that I, EUGENE H. PETERS, a citizen of the United States, residing at Benton Harbor, in the county of Berrien and State of Michigan, have invented certain new and useful Improvements in Harrows; and I do hereby declare the following to be a full, clear, and exact description of the invention, such as will enable others skilled in the art to which it appertains to make and use the same.

My invention relates to new and useful improvements in harrows, and more particularly to that class known as "disk" harrows; and my object is to first provide means for conveying the harrow from place to place without the disks thereof engaging the ground.

A further object is to provide means for regulating the depth to which the disks enter the ground.

A still further object is to provide means for extending the disks laterally on the harrow-frame.

A still further object is to provide means whereby that part of the frame carrying the disks may be reversed from end to end, thereby directing the earth to or from the center of the harrow.

A still further object is to provide means for disposing said disks at an angle to the frame.

Other objects and advantages will be hereinafter made clearly apparent in the specification and pointed out in the claims.

In the accompanying drawings I have shown the preferred form of my invention.

In said drawings, Figure 1 is a top plan view of my improved harrow, showing one set of the disks disposed away from the center of the frame. Fig. 2 is a rear elevation of my improved harrow in position to be conveyed from place to place. Fig. 3 is a central longitudinal sectional view thereof. Fig. 4 is a detail plan view of one set of disks and the frame carrying the same; and Fig. 5 is a sectional view as seen from line 5 5, Fig. 1.

Referring to the figures by numerals of reference, 1 indicates the main frame of my improved harrow, to the under side of which is secured a transversely-disposed bar 2, which is secured to the frame 1 at its center in any preferred manner and is held rigidly in place by means of brace-rods 3, said rods extending from the front portion of the frame 1 to the opposite ends of the bars 2 and are secured thereto by means of bolts or the like. Telescopically mounted upon each end of the bar 2 are frames 4 and 5, said frames being provided with channels 8, in which is seated the transversely-disposed bar 2. The outer ends of said frames 4 and 5 are secured together by means of the end sections 9, said end sections being preferably formed integral with the frames, while the opposite ends thereof are secured together by means of blocks 10.

Pivotally secured to the frames 4 and 5 are auxiliary frames 11, said auxiliary frames being secured in position upon the frames 4 and 5 by means of king-bolts 12, said king-bolts 12 passing through plates 13, secured to the lower side of the frames 4 and 5, and through similar plates 14, secured to the auxiliary frames 11, and as said plates and bolts are disposed at the longitudinal center of the main and auxiliary frames said auxiliary frames may be turned from end to end and still retain their relative positions with the main frame. Secured to the auxiliary frames 11 are depending brackets 15, said brackets having boxings 16 at their lower ends, in which are rotatably mounted shafts 17. A plurality of cutting-disks 18 are disposed at intervals throughout the length of said shafts and are rotatably secured thereon in any preferred manner. Each of the main frames 4 and 5 and the auxiliary frames 11 are provided with registering slides or bearing-plates 19 and 20, respectively, said slides being mounted in pairs and faced against each other so that when said auxiliary frames are placed at an angle to the main frames said auxiliary frames will be held from tilting. The auxiliary frames 11 are disposed at different angles to the plane of the main frames 4 and 5 through the medium of rack-bars 21, carried by the inner ends of the main frames 4 and 5 and with which cooperate the locking-levers 22, said locking-levers having links 23 at their lower ends, said links being secured to the auxiliary frames 11 through the medium of bolts 25, said bolts being secured to and extending upwardly from the auxiliary frames 11. It will therefore be seen that when it is desired to move the auxiliary frames out of alinement with the main frames said result may be accomplished by moving the levers forwardly or rearwardly over the rack-bars 21, said levers and frames being held in their adjusted position through the medium of a spring-controlled latch 26, engaging the racks upon the rack-bars 21.

When it is desired to turn the auxiliary frames 11 from end to end in order to throw the earth toward or away from the center of the harrow, the links 23 are removed from the bolts 25, when said auxiliary frames may be rotated on the king-bolts 12, after which the links 23 are again secured to the bolts 25, carried at the opposite ends of the auxiliary frames 11.

In using harrows of this class in orchards or groves of different classes it is a difficult matter to cultivate the earth below the trees or bushes, owing to the fact that the limbs prevent the draft-animals from passing thereunder, and to this end I have provided the telescoping frames 4 and 5, said frames being so arranged that when it is desired to cultivate ground below the trees or bushes the frames carrying the disks may be moved outwardly on the transversely-disposed bar 2, as best shown in Fig. 1 of the drawings, thereby disposing the cutting-disks to one side of the draft-animals, so that said disks will be disposed so as to pass below the limbs of the trees or bushes and cultivate the ground thereunder. The frames 4 and 5 are held in position upon the transverse bar 2 by means of pins 27, said pins being disposed through registering bores in the frames 4 and 5 and the transversely disposed bar 2. The front end of the main frame 1 is provided with a swivel-coupling 28, through which extends a squared shaft 29, said shaft having an axle 30 at its lower end, upon the opposite ends of which are mounted supporting-wheels 31. The axle 30 is also provided with a forwardly and upwardly extending shank 32, which passes through a projection 33 on the swivel-coupling 28 and is provided in its length with a plurality of openings 34. A tongue 35 is disposed around the shank 32 and is adjustably secured thereto by means of a pin 36, taking through any one of the openings 34 and through a similar opening in the tongue 35. The height of the forward end of the frame 1 upon the shaft 29 is regulated by means of a set-screw 37, which passes through the swivel 28 and engages the shaft 29 so that when the frame 1 has been elevated to the proper height the set-screw is turned inwardly until it engages the shaft 29 and holds said frame in its adjusted position. By having the forward part of the truck arranged as described and secured to the frame of the harrow by means of the swivel 28 it will be seen that the strain upon the tongue incident to the turning of the harrow will be dispensed with and the harrow caused to turn through the medium of the draft upon the doubletrees.

A larger pair of wheels 38 are disposed at the opposite end of the frame 1, said wheels being mounted upon an axle 39, which is in turn carried by a frame 40, said frame having a pair of upwardly-extending bars 41, which are disposed through suitable ways 42 in the frame 1 and are connected at their upper ends by means of the cross-head 43, said cross-head having rack-teeth 44 on the upper edge thereof. Pivotally mounted upon the cross-head 43 is a lever 45, said lever having a spring-controlled latch 46, adapted to engage with the teeth upon the rack-bar 44. The lower end of the lever 45 is bifurcated and has that portion of its bifurcated ends beyond its pivot-point directed at right angles to the main portion of the lever and is pivotally connected to the frame 1 by means of a substantially U-shaped link 47, so that when the lever 45 is disposed in the position shown in Fig. 3 of the drawings the disks 18 will be disposed out of engagement with the earth and in readiness to be conveyed from one place to another. When, however, it is desired to cultivate the ground, the lever 45 is moved to the opposite side of the rack-bar 44, thereby lowering the frame 1 until the disks 18 are in engagement with the earth, and the depth to which said disks may enter the earth is controlled by means of said lever, rack-bar, and link, it being understood that the higher the rear end of the frame 1 is elevated on the bars 41 the less the earth will be disturbed by the disks. A seat 48 is disposed upon the frame 1 and in reach of the levers 22 and 45, so that the operator can control said levers when in their normal positions without dismounting from the harrow.

What I claim is—

1. A harrow of the class described comprising a frame or body portion, a transverse bar rigid with said body portion, channeled frames telescopically mounted on said bar, auxiliary frames below said channeled frames, plates on said channeled and auxiliary frames having registering bores, bolts disposed through said bores to rotatably secure said auxiliary frames to said channeled frames, a plurality of disks carried by said auxiliary frames and means carried by the channeled frames to vary the path of said disks.

2. In a harrow of the class described, the combination with a frame having a plurality of cutting-disks secured thereto; of supporting means for the rear end of said frame comprising an axle, wheels secured to said axle, a circular frame on said axle, upwardly-extending bars carried by said circular frame and extending through said first-mentioned frame, a cross-head connecting the upper ends of said bars, a rack-bar on said cross-head, a bifurcated lever pivoted to said cross-head and having means to coöperate with said rack-bar, right-angled extensions rigid with said bifurcated ends, a substantially U-shaped link disposed between the first-mentioned frame and said right-angled extension to raise and lower said frame.

3. A harrow of the class described comprising a frame, a bar secured to said frame, telescoping frames carried by said bar, auxiliary frames carried by said telescoping frames, slides between said auxiliary frames and telescoping frames, cutting-disks carried by said auxiliary frames, means to vary the path of said disks, and additional means to raise or lower said disks.

4. In a harrow of the class described, the combination with a frame having a plurality of cutting-disks secured thereto; of supporting means for the rear end of said frame comprising an axle, wheels secured to said axle, a circular frame on said axle, upwardly-extending bars carried by said circular frame and extending through said first-mentioned frame, a cross-head connecting the upper ends of said bars, a rack-bar on said cross-head and means interposed between said cross-head and the first-mentioned frame to raise or lower the same.

In testimony whereof I have signed my name to this specification in the presence of two subscribing witnesses.

EUGENE H. PETERS.

Witnesses:
RALPH PETERS,
BERD BISHOP.